United States Patent [19]

Stein et al.

[11] 4,011,159

[45] Mar. 8, 1977

[54] METHOD OF REMOVAL OF PETROLEUM PRODUCTS FROM SOLID OR LIQUID SURFACES

[75] Inventors: Claude Stein; André Marbach, both of Verneuil-en-Halatte, France

[73] Assignee: Societe Chimique des Charbonnages, Paris, France

[22] Filed: Oct. 24, 1975

[21] Appl. No.: 625,838

[30] Foreign Application Priority Data

Oct. 24, 1974 France .............................. 74.35709

[52] U.S. Cl. .................................. 210/40; 134/7; 210/DIG. 26
[51] Int. Cl.² .......................................... B01D 15/00
[58] Field of Search ...................... 210/40, DIG. 26; 526/281; 134/6, 7

[56] References Cited

UNITED STATES PATENTS

| | | | |
|---|---|---|---|
| 3,265,616 | 8/1966 | Wyllie et al. ............... | 210/DIG. 26 |
| 3,274,103 | 9/1966 | Adams ......................... | 210/DIG. 26 |
| 3,330,815 | 7/1967 | McKeon et al. .................... | 526/281 |
| 3,367,924 | 2/1968 | Rinehart ............................. | 526/281 |
| 3,520,806 | 7/1970 | Haigh ........................... | 210/DIG. 26 |
| 3,546,183 | 12/1970 | Vergne et al. ..................... | 526/281 |

Primary Examiner—Frank A. Spear, Jr.
Assistant Examiner—Ivars Cintins
Attorney, Agent, or Firm—Karl W. Flocks

[57] ABSTRACT

A method of removal of petroleum products from solid or liquid surfaces, in which the petroleum product is covered with a finely-divided solid polymer, said polymer being selected from the group consisting of poly(-bicyclo [2.2.1]heptene-2 and poly(methyl-5 bicyclo [2.2.1]heptene-2) mainly obtained by opening the cycle of bicyclo [2.2.1]heptene-2 and its methyl derivative. After the finely-divided polymer is applied to the petroleum, there is obtained a strong solid rubbery film, the film being removable by mechanical means.

7 Claims, No Drawings

METHOD OF REMOVAL OF PETROLEUM PRODUCTS FROM SOLID OR LIQUID SURFACES

The present invention relates to a method of removal and recovery of hydrocarbons, especially petroleum hydrocarbons such as crude petroleum or petroleum fractions, from liquid or solid surfaces.

Considerable study has been given during the last few years to means for remedying accidental leakages of petroleum or petroleum products such as may occur in a machine room and in particular on the surface of seas, lakes and rivers. In the pollution of aqueous surfaces in particular, numerous methods have been proposed, based either on the dispersion of the oily substances into fine particles or on the adsorption of these oily substances by substances heavier than water such as powdered chalk, which carry away at least a part of these substances towards the bottom, or alternatively on the adsorption of the oily substances by bodies lighter than water such as sawdust, light ceramic blocks, or again by plates or strips of light polymer.

The first two methods have the disadvantage that they do not really remove the petroleum products and for this reason do not prevent what may be at least possible pollution. For this reason, the removal of petroleum products by substances lighter than water, which float on the surface of the water, has been the method most studied up to the present time.

This method is however itself not entirely satisfactory, at least according to the known alternative forms of execution. If absorbents of relatively large dimensions are employed, such as ceramic blocks or plates of polymer foam, the sorption of the petroleum substances is slow. When finely-divided substances such as sawdust are used, the recovery of this substance impregnated with petroleum gives rise to difficulties. Finally, the quantity of petroleum products sorbed by the substances utilized up to the present time is generally fairly small.

The present invention has for its object a method which does not present the disadvantages of the prior art. This method is based on the discovery made by the Applicants that the polymers obtained by opening the cycle of bicyclo [2.2.1]heptene-2 and especially of bicyclo [2.2.1]heptene-2 itself and its methyl derivative, form with petroleum hydrocarbons a coherent film which may contain up to 10 parts by weight of petroleum products to one part of polymer of bicyclo [2.2.1]heptene-2.

The method according to the invention is thus characterized by the fact that there is put into contact with the petroleum liquid accidentally spread over a surface, a polymer of the type referred to above, in a divided form, for example in the form of small particles or of a lightened powder, for a sufficient time, and that the resultant film formed is removed by any appropriate mechanical means known per se, such as a hauled mobile filter-barrier, a system of rollers provided with winding means, a net and the like.

As the finely-divided polymer, there will advantageously be employed a poly (bicyclo [2.2.1]heptene-2) having an apparent density of 0.20 to 0.35 and particle dimensions of 0.01 to 2 mm.

A polymer of this kind may be obtained by the method described in U.S. Patent Application No. 561,789.

The quantity of polymer utilized is preferably greater than 10% of the weight of the spread petroleum product, and more particularly may be between 10 and 16% of the weight of the said petroleum product.

The invention will be more clearly understood by means of the following examples, given by way of illustration and not in any limitative sense.

EXAMPLE 1

To 30 liters of water containing 30 grams per liter of NaCl and maintained under agitation at 18° C, there are added by pouring over the surface 84 grams of crude petroleum having a density of 0.8398 (API = 37).

When the petroleum layer has become uniformly distributed, there are sprinkled on this layer 15 grams of poly (bicyclo [2.2.1]heptene-2) marketed commercially by the CdF -Chimie, Societe Chimique des Charbonnages under the name of NORSOREX having $d_a = 0.25$. At the end of 5 minutes, all the petroleum is absorbed by the polymer and the film obtained possesses mechanical properties which enable it to be removed by traction.

EXAMPLE 2

To 30 liters of water containing 30 grams per liter of NaCl and maintained under agitation at 18° C, there are added 100 grams of crude petroleum having a density of 0.8984 (API = 26). distributed, it is sprinkled with 10 grams of NORSOREX having an apparent density of 0.25.

After 8 minutes, all the mass of petroleum is absorbed by the polymer, the whole of which is characterized by a continuous film on the surface of the water. This film can be very simply recovered by means of a net or other suitable device.

In the same way, it is possible to obtain a tractable film by pouring the polymer applied according to the invention over a pool of petroleum product, in a machine-room for example.

It should be observed that by reason of the great affinity of poly(bicyclo [2.2.1]heptene-2) for petroleum products, there are obtained non-staining films of a rubbery nature. These films can be burned as waste or after they have been shaped they may be used as fuel; or alternatively they may be employed in the rubber industry.

It will of course be understood that without departing from the scope of the said invention there may be added to the poly(bicyclo [2.2.1]heptene-2) other mineral or organic absorbent substances in such quantity that it does not prevent the formation of a tractable film.

It will furthermore be clear that the present invention has only been described purely by way of explanation and not in any restrictive sense, and that any useful modification may be made thereto without departing from its scope as defined in the appended claims.

We claim:

1. A method of removal of petroleum products from solid and from liquid surfaces, comprising
    forming a strong, solid, rubbery, self-supporting film of polymer and said petroleum product by covering said petroleum product with a finely-divided solid polymer selected from the group consisting of poly(bicyclo [2.2.1]heptene-2) and poly(methyl-5 bicyclo [2.2.1]heptene-2) mainly obtained by opening the cycle of bicyclo [2.2.1]heptene-2 and its methyl derivative; and removing said strong, solid, rubbery self-supporting film from the solid or liquid surface.

2. A method as claimed in claim 1, in which there is utilized at least 10% by weight of the polymer with respect to the petroleum product to be removed.

3. A method as claimed in claim 1, in which the said polymer has an apparent density of 0.20 to 0.35.

4. A method as claimed in claim 1, in which the said polymer has a particle size of 0.01 to 2 mm.

5. A method in accordance with claim 1, wherein said film is removed by mechanical means comprising a hauled mobile filter barrier.

6. A method in accordance with claim 1, wherein said film is removed by mechanical means comprising a system of rollers provided with winding means.

7. A method as set forth in claim 1 wherein said film is removed by a net.

* * * * *